United States Patent [19]

Reinwall, Jr.

[11] 3,844,194
[45] Oct. 29, 1974

[54] WEDGE ANCHOR DEVICE
[75] Inventor: Ernest William Reinwall, Jr., McHenry, Ill.
[73] Assignee: Illinois Tool Works, Inc., Chicago, Ill.
[22] Filed: Feb. 14, 1973
[21] Appl. No.: 332,456

[52] U.S. Cl. ................................................ 85/79
[51] Int. Cl. ....................................... F16b 13/04
[58] Field of Search ........................... 85/79, 77, 75

[56] References Cited
UNITED STATES PATENTS

| | | | |
|---|---|---|---|
| 741,563 | 10/1903 | Stevens et al. | 85/79 |
| 2,172,976 | 9/1939 | Johnson | 85/79 |
| 2,787,931 | 4/1957 | McCabe | 85/77 |
| 3,181,414 | 5/1965 | Dickow | 85/75 |
| 3,342,097 | 9/1967 | Rocheleau | 85/79 |
| 3,709,089 | 1/1973 | Seetaram | 85/77 |

FOREIGN PATENTS OR APPLICATIONS
263,813  7/1964  Australia .............................. 85/79

Primary Examiner—Edward C. Allen
Attorney, Agent, or Firm—Robert W. Beart; Thomas W. Buckman

[57] ABSTRACT

An anchor bolt assembly preferably manufactured by cold forging tenchiques which includes a wedge member slidably disposed on inclined camming surfaces. The wedge being preassembled on a shank so that the circumferential periphery of the assembly is substantially constant from one extremity to the other to allow the assembly to be used in a hole approximately the same diameter as the diameter of the shank. Longitudinal ribs and slots are formed on the inclined ramp portion to both strengthen the assembly and locate and retain the wedge on the shank.

5 Claims, 11 Drawing Figures

PATENTED OCT 29 1974　　3,844,194

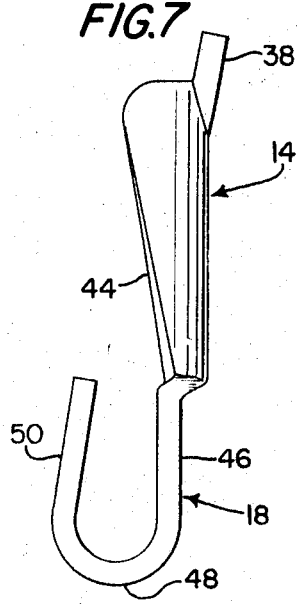
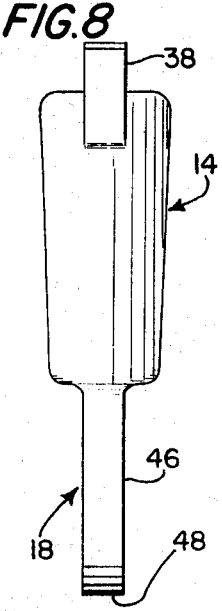
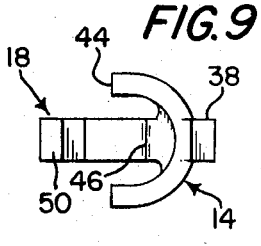
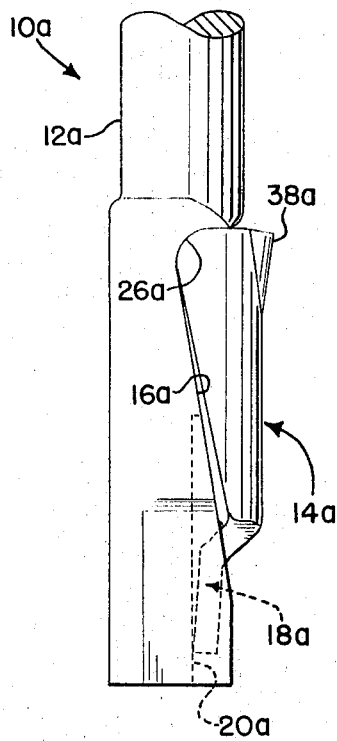
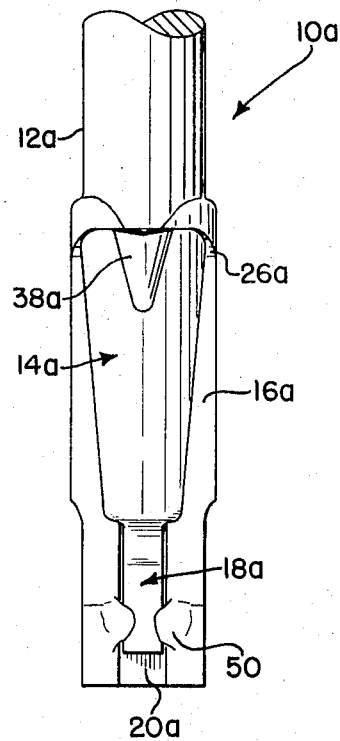

WEDGE ANCHOR DEVICE

BACKGROUND OF THE INVENTION

Blind hole attachment systems have become a common requirement in construction using concrete or other relatively thick and hard surfaces. Frequently this attachment is accomplished by using a bolt member associated with various wedge-type expansion assemblies, which by their design require a predrilled hole substantially larger than the diameter of the bolt. The use of such techniques requiring oversized holes is extremely undesirable in most cases when workmen desire to maximize the loading capabilities of the bolt and minimize the effort to prepare the workpiece for anchoring.

There are a number of prior art devices in which the hole formed in the concrete is substantially the same size as the bolt. These devices generally include a tapered or necked-down portion of reduced diameter forming a frusto-conical camming surface upon which slidable elements are mounted to provide a wedging anchor as the bolt is withdrawn. However, these types of devices have disadvantages in that the reduced diameter portion severely reduces the strength of the system. Also, since it is common practice to provide withdrawal motion to the bolt by tightening a nut on a protruding threaded portion, the prior art devices had a tendency to rotate within the hole during tightening, thus precluding the anchoring device to be firmly set.

SUMMARY OF THE INVENTION

The present invention provides a two piece anchoring assembly which is particularly adapted to provide a blind hole fastener for use in concrete or the like. The anchor assembly is particularly designed and structured for use in preformed holes which are generally the same size as the diameter of the bolt or shank portion of the anchoring device. This system allows a heavy fixture to be accurately positioned, holes drilled in the supporting structure through apertures in the fixture, and the subsequent insertion of the anchor bolt assembly in the predrilled hole without removing the fixture.

A further feature of the invention is the use of swaging or cold forging techniques to deform a portion of the shank to provide wedging or camming surfaces while not appreciably reducing the cross-sectional area of the shank in any region, thus providing maximum strength capabilities to the bolt assembly.

The one piece wedge incorporated in this invention enables the terminal portion of the assembly to provide maximum surface contact between the assembly and the walls of the hole. This increases the pull out resistance of the bolt.

A further advantage of the invention is the ability of the two piece assembly to be preassembled and remain in the preassembled mode during shipment and other periods of time immediately prior to use.

Still a further advantage of the invention is the elimination of the tendency of a bolt and wedge to rotate within a hole and also the tendency of a wedge to rotate relative to the bolt when torque is applied to the bolt in an effort to effect wedging.

The above and other objects and advantages of the present invention are incorporated in a bolt assembly with a terminal portion deformed, as by swaging, to form an inclined camming surface and a shoulder surface. Positioned for slidable movement on the camming surfaces is a sheet metal wedge with a tail portion extending downwardly and received in a longitudinal slot on the shank. Positioned beneath the wedge and extending generally longitudinal of the shank is a rib-like structure which is formed during the swaging of the camming surfaces. This rib serves to strengthen the bolt at the juncture of the camming surfaces with the shoulder as well as supporting the wedge and eliminating the tendency of the wedge to rotate relative to the shank.

BRIEF DESCRIPTION OF THE DRAWINGS

FIG. 7 is a side view of the preferred embodiment of the wedge member of the present invention.

FIG. 8 is a front view of the wedge member shown in FIG. 7.

FIG. 9 is a bottom end view of the wedge member shown in FIG. 7.

FIG. 10 is a partial side elevational view of an alternate embodiment of the invention described herein.

FIG. 11 is a front elevational view of the invention shown in FIG. 10.

DETAILED DESCRIPTION OF THE PREFERRED EMBODIMENT

Figure 1:
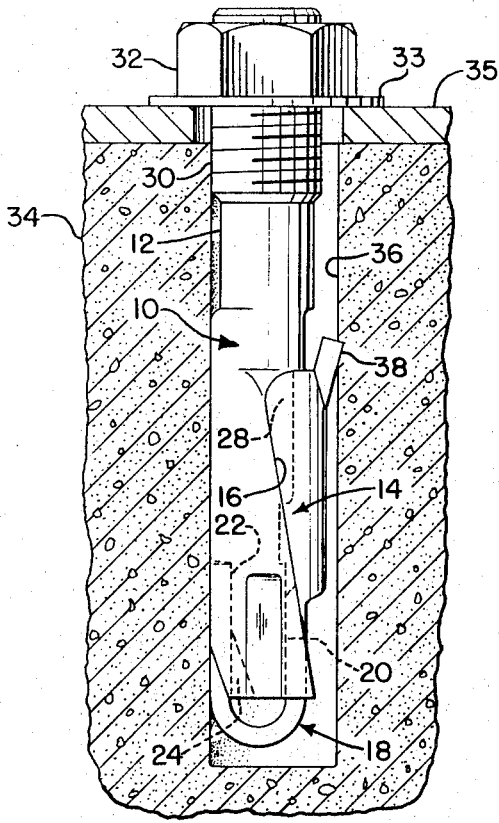
FIG. 1 is a sectional side elevational view of the anchor assembly in position in a preformed hole prior to moving the bolt to provide a wedging interaction between the assembly and the hole.

Referring now to the drawings, it will be seen that the anchor assembly 10 comprises a cylindrical shank portion 12 which includes at one end thereof a threaded portion 30 adapted to receive a complementary rotary fastening element, such as nut 32. The other extremity of the shank is deformed, as by cold forging or swaging, to provide camming surfaces 16 which are inclined inwardly from the terminal edge 42 to intersect with a shoulder or abutment surface 26. A rib-like projection 28 is located intermediate the pair of inclined surfaces 16 and extends downwardly from the shoulder. A longitudinal slot 20 is likewise located between the surfaces 16 and which extends from the rib to the end face 42 of the bolt.

A wedge member 14 of a generally arcuate cross section is provided with, as shown in FIGS. 7, 8 and 9, edge portions 44 which are configured to be complementary to the inclined surfaces 16 so that relative longitudinal movement of the shank and the wedge provides radial expansion of the assembly at the terminal portion thereof.

Figure 2:
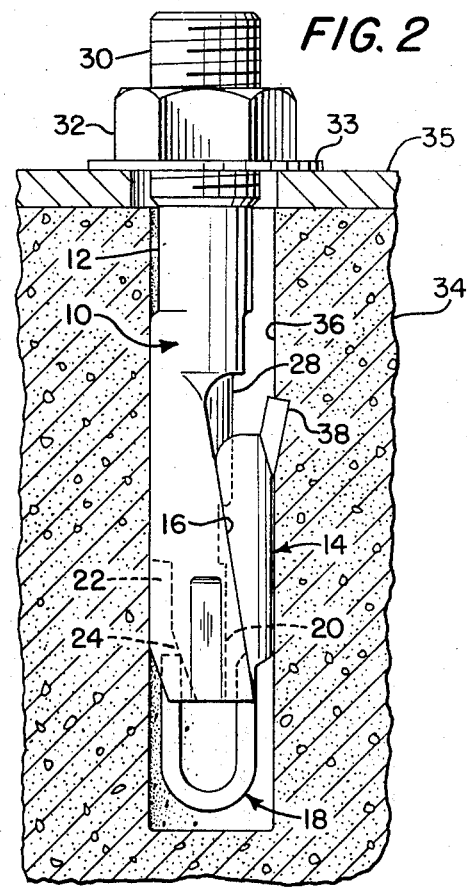
FIG. 2 is a sectional side elevational view similar to that of FIG. 1 showing the assembly after the bolt has been retracted slightly from the hole to provide wedging contact between the assembly and the hole.
Figure 3:
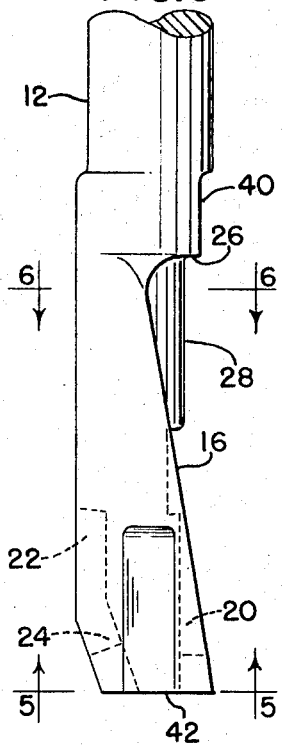
FIG. 3 is a partial side view of the shank member showing the terminal portion with the inclined camming surfaces formed thereon.
Figure 4:
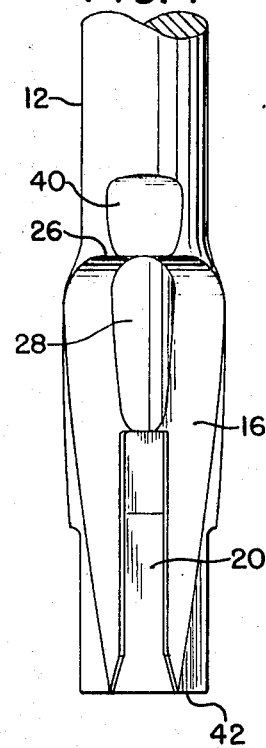
FIG. 4 is a front view of the shank portion shown in FIG. 3.
Figure 5:
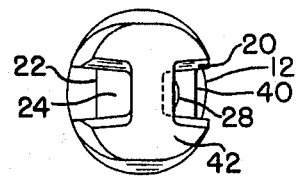
FIG. 5 is an end view of the shank shown in FIGS. 3 and 4.
Figure 6:
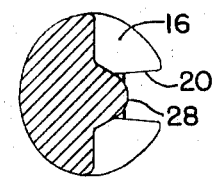
FIG. 6 is a cross-sectional view taken along the lines 6—6 of FIG. 3.

As is shown clearly in FIGS. 1 and 2 as well as FIGS. 7 and 8, one extremity of the wedge member 14 is provided with an integral tail-like member 18 which is adapted to extend generally longitudinally of the wedge and the anchor assembly when positioned thereon. In the preferred embodiment, this tail member is generally U-shaped and includes essentially three portions, i.e., a longitudinally extending portion 46, a bail portion 48 and a longitudinally extending portion 50 extending generally parallel to portion 46 and which is adapted to be associated with a circumferential segment of the shank diametrically opposed to the circumferential segment which receives the wedge member. The purpose of this structural relationship will be set forth later herein.

Attention is now directed to FIGS. 3-6 wherein the various structural features of the terminal portion of the shank are set forth and will be explained in detail. Due to the use of cold forging or swaging techniques, the shank 12 incorporates a number of desirable structural features in the terminal portion thereof. The inclined camming surfaces 16, shoulder portion 26, rib 28 and longitudinal slot 20 are uniquely interrelated to enable the cross-sectional area of the shank 12 to be substantially constant throughout its entire length. Thus, no apparent weak region results from the provision of camming surfaces 16 and shoulder 26. As can be seen from the view from FIG. 6, the rib portion substantially eliminates such a weakness at the juncture of the shoulder and the camming surfaces. The shank is also slightly flattened in the region of the rib to retain the structural integrity of the assembly without significantly increasing the circumference of the assembly in that region. A slot 20 of decreasing depth from the edge 42 is provided which is generally in longitudinal alignment with the rig 28. A longitudinal slot 22 is formed in the terminal portion and extends longitudinally in the same diametrical plane as the slot 20. In addition, the rear slot 22 includes an inclined ramp surface 24 which facilitates the preassembly of the wedge to the shank.

In operation, the preassembled shank 12 and wedge 14 are inserted in a hole 36 in a concrete structure 34. The uppermost extremity of the shank extends through a suitable aperture in a workpiece 36. Since the assembly is designed to be used in a hole which is generally the same size as the shank 12, the assembly may have to be forced into the hole slightly. Attention is therefore directed to the barb-like protrusion 38 which extends radially from the assembly and which is integrally formed on the wedge. This barb provides a spring-like positive lock for the assembly within the hole. As the assembly is forced into the hole, the barb may be forced inwardly but remains aggressively biased against the wall of the hole. It should be apparent that this barb functions to both prevent the wedge from movement upwardly in the hole as well as serving to prevent rotation within the hole. When the assembly 10 has been forced into the hole to a suitable depth, nut 32 is applied and rotated downwardly causing the shank to retract slightly as shown in FIG. 2. A washer 33 may be provided to increase the bearing surface of the nut when desirable. Since the wedge is prevented from moving axially upwardly in the hole, the movement of the bolt causes the entire terminal portion, which includes the wedge, to expand radially and aggressively impinge the entire circumferential surface surrounding the terminal portion. This total surface contact serves to prevent the assembly from rotating within the hole when the nut is rotated as well as enhancing the locking or total pull out resistance of the assembly. It should be recognized that the tail portion 18 of the wedge is free to slide longitudinally within the slots 20 and 22, thus allowing the relative movement between the camming surfaces 16 and the edges 44 on the wedge to effect the radial expansion required.

In practice, the U-shaped tail 18 may be formed as in FIG. 7 to provide a spring clip-like attachment to the terminal portion of the shank, thus enabling the wedge to be preassembled to the shank and shipped without fear of dislodgment or disassociation of the wedge from the shank prior to application.

The rib member 28, in addition to strengthening the shank, serves to locate and guide the relative movement of the wedge as well as preventing the wedge from rotating relative to the shank. The rib 28 is formed to be complementary to the arcuate shape of the wedge. This feature thus aids in preventing the undesired relative rotation.

Slots 20 and 22 further prevent this relative rotation due to the positioning therein of tail portions 46 and 48.

During the forging or swaging process, the shank may be provided with a further depression 40 which will enable the barb 38 to be biased or forced inwardly to minimize the circumference of the assembly at that particular portion. This refinement is consistent with the ability of this assembly to be used in a hole which closely approximates the diameter of the shank 12.

It should be understood that there may be other alternatives or embodiments which produce the objects and advantages of the present invention and still come within the scope of the teachings found herein. One such alternate embodiment is shown in FIGS. 10 and 11.

The terminal portion of a shank 12a on assembly 10a is deformed by swaging in a manner similar to that of the preferred embodiment and which similarly includes the provision of a reinforcing rib extending generally longitudinally of the shank and which is also provided with a slot 20a. However, in this embodiment, the tail 18a does not extend around the end of the shank but is retained from separation by deforming portions of the slot over the tail as it is situated in the slot. This will enable the wedge 14a to move a limited but acceptable relative longitudinal distance to the shank and provide the same locking and retention characteristics as the primary embodiment. The locking barb 38a is a struck-out portion having a somewhat smaller radius than the radius of the wedge body and is adapted to springingly engage the wall of the hole much like the barb 38.

While the invention has been shown as including a threaded shank portion, it should be understood that any means for attachment, such as a hole in the extremity of the shank, can be provided which will enable the assembly to be slightly retracted and yet allow a workpiece to be affixed thereto.

While the foregoing is a description of certain preferred embodiments of the invention, the invention is not to be construed as being limited to any of the specific features described herein but should be interpreted as covering all variations thereof that come within the broad scope of the appended claims.

I claim:

1. An expandable anchor assembly including a cylindrical shank member, one terminal portion of the shank being swaged to provide camming surfaces and a shoulder surface in one circumferential segment of the shank, the camming surfaces being inclined inwardly toward the shoulder surface from the extremity of the said one terminal portion, the camming surfaces comprising a pair of generally flat continuous coplanar surfaces extending from the extremity of the terminal portion to the shoulder, the surfaces being laterally separated by a rib extending from the shoulder toward the extremity of the terminal portion, a first longitudinal slot positioned between the camming surfaces and extending from the rib to the terminal extremity of the shank, a wedge member constructed of sheet spring-like material and having a generally arcuate cross-sectional configuration of generally constant thickness and including edge surfaces which slidably engage the camming surfaces of the shank, the extremity of the wedge member adjacent the shoulder surface including a spring-like barb portion extending radially outwardly of the assembly and adapted to aggressively impinge the wall of an associated hole and resist withdrawal of the assembly from the hole, the circumference of the terminal portion of the anchor assembly, when the wedge is adjacent the shoulder, generally corresponding to the circumference of the cylindrical shank member, the wedge member including a generally U-shaped tail portion integral with the extremity of the wedge opposite the extremity which includes the barb portion, the shank further including a second longitudinally extending slot formed in the circumferential segment of the shank diametrically opposed to the first slot, the U-shaped tail thus being adapted to extend over the terminal edge of the shank and to aggressively engage both of said slots to retain the wedge member on the shank as well as preventing the lower extremity of the wedge from moving laterally of the shank portion wherein an anchored connection within a preformed hole of a size approximating the diameter of the cylindrical shank is provided and which insures substantially constant contact between the edge portions of the wedge and the camming surfaces of the shank while retaining and supporting the wedge throughout substantially its entire length from rotating or moving laterally relative to the shank.

2. An anchor assembly in accordance with claim 1, wherein the periphery of the terminal portion is generally continuous when the wedge member has been attached thereto to provide maximum surface contact between the hole and the anchor assembly.

3. An anchor assembly in accordance with claim 1, wherein the second slot includes an inclined ramp portion to facilitate the assembly of the wedge on the terminal portion of the shank.

4. An expandable anchor assembly in accordance with claim 1, wherein the shank includes a threaded portion at the other terminal portion.

5. An expandable anchor assembly in accordance with claim 1, wherein the cross-sectional area of the shank is substantially constant throughout its axial extent.

* * * * *